(12) United States Patent
Ari (10) Patent No.: US 8,091,697 B2
(45) Date of Patent: Jan. 10, 2012

(54) DRIVER UNIT FOR A CLUTCH ASSEMBLY, IN PARTICULAR A WET-RUNNING DOUBLE CLUTCH ASSEMBLY

(75) Inventor: Vural Ari, Wooster, OH (US)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 891 days.

(21) Appl. No.: 12/082,466

(22) Filed: Apr. 11, 2008

(65) Prior Publication Data
US 2008/0257678 A1 Oct. 23, 2008

Related U.S. Application Data (60) Provisional application No. 60/923,812, filed on Apr. 16, 2007.

(51) Int. Cl.
*F16D 13/52* (2006.01)
*F16D 13/58* (2006.01)
(52) U.S. Cl. .................. 192/112; 192/70.19; 403/349
(58) Field of Classification Search ............. 192/70.19, 192/112
See application file for complete search history.

(56) References Cited

U.S. PATENT DOCUMENTS

| 6,491,149 | B1 * | 12/2002 | Kundermann et al. ...... 192/48.9 |
| 6,883,656 | B2 | 4/2005 | Schmidt et al. .............. 192/70.2 |
| 6,915,892 | B2 * | 7/2005 | Bauer et al. .................... 192/207 |
| 7,007,783 | B2 * | 3/2006 | Gerathewohl et al. ....... 192/70.2 |
| 2004/0060795 | A1 * | 4/2004 | Schmidt et al. .............. 192/70.2 |
| 2006/0081435 | A1 * | 4/2006 | Heinrich et al. ........... 192/70.11 |
| 2007/0193848 | A1 * | 8/2007 | Uhler et al. .................... 192/112 |
| 2007/0221468 | A1 * | 9/2007 | George et al. ............. 192/87.11 |

FOREIGN PATENT DOCUMENTS

| DE | 102005025979 | 12/2006 |
| EP | 1643114 | 4/2006 |

* cited by examiner

*Primary Examiner* — Richard M. Lorence
(74) *Attorney, Agent, or Firm* — Davidson, Davidson & Kappel, LLC (57) ABSTRACT

A driver module for clutches, in particular wet-running double clutch assemblies, including a clutch housing and a cover which are connected with each other, enclosing an interior space. The cover is rotationally fixed in relation to the clutch housing in the axial direction and in the circumferential direction by a connecting ring.

21 Claims, 6 Drawing Sheets

DRIVER UNIT FOR A CLUTCH ASSEMBLY, IN PARTICULAR A WET-RUNNING DOUBLE CLUTCH ASSEMBLY

Priority to U.S. Provisional Patent Application Ser. No. 60/923,812, filed Apr. 16, 2007 is claimed, the entire disclosure of which is hereby incorporated by reference herein.

The invention relates to a driver module for a clutch assembly, in particular a wet-running double clutch assembly, comprising a clutch housing and a cover which are connected with each other, enclosing an interior space for receiving the clutch assembly.

BACKGROUND

A driver module for a multiple-disk clutch system is previously known from published patent U.S. Pat. No. 6,883,656 B2. The driver module includes a clutch housing and a cover, which can be joined to each other in a rotationally fixed connection. The joining forms an interior space to receive the clutch assembly. The clutch housing and clutch cover are situated coaxially, and have a common axis of rotation. The rotationally fixed connection is accomplished through mutually complementary sets of teeth, which are engaged with each other in the radial direction. However, during operation the cover expands essentially in the radial direction relative to the clutch housing, as the speed of rotation of the driver module increases. In consequence, at high speeds of rotation this results in free play between the internal and external toothing, which expands further with increasing speed. This results in a disturbing rattling sound. To prevent such sounds, it is known to provide the clutch housing with a plurality of internal sets of teeth, which are suitable for being brought elastically into meshing engagement with a plurality of external sets of teeth under internal stress. This solution results in eliminating the sounds, but requires highly precise fabrication, since in particular the securing in the axial direction is also carried out by means of sets of teeth engaged with each other, so that the individual toothing surfaces must also be designed according to the loads that occur, in order to produce the requisite surface pressures.

SUMMARY OF THE INVENTION

An object of the invention is to refine a driver module for a clutch assembly, in particular for wet-running double clutches, so that it is subject to lesser demands in terms of manufacturing precision, so that there is powerful sound damping, in particular when idling, and also so that it is easy to install and uninstall.

An advantageous embodiment of the present invention provides a driver module for a clutch assembly, in particular a wet-running double clutch assembly, including a clutch housing and a cover which are connected with each other, enclosing an interior space that receives the clutch assembly. The coupling between the cover and the clutch housing may be rotationally fixed, and is secured by means of a connecting ring. This makes it possible to realize the fixing in the axial and circumferential directions through the connecting ring alone, as well as also, depending on the design, to create a driver module that can be realized free of pre-tensioning of the individual elements, that is easy to install and also to uninstall and yet is quiet in terms of sound propagation, in particular when idling.

The rotationally fixed connection between the cover and the clutch housing is preferably totally without free play in the axial direction, so that there is no play between the elements, even in the event that the clutch is not being operated and hence no bracing occurs against the cover or the wall of the housing.

In accordance with various embodiments of the invention, the rotationally fixed connection may be made in the circumferential direction with limited ability to rotate between cover and clutch housing, preferably through an elastic damping element and with a restriction of torque, so that a relative motion within a certain measure may be allowed in the circumferential direction, but which may be limited by a fixed stop. This embodiment may make it possible to also damp vibrations, in particular when idling, which contributes to a significant reduction of sound propagation.

Preferably, the connecting ring, together with the connecting elements—housing and cover—is fixed in the axial direction by means of a bayonet connection, this bayonet connection being formed between clutch housing, cover and connecting ring in the axial direction and this positive lock being secured in the circumferential direction by means of a snap connection. This snap connection makes it possible to assemble and disassemble the entire unit easily by removing the connecting ring. In terms of concrete embodiments, different variants are distinguished. However, they may include providing a positive lock in the axial or circumferential direction between the cover and the housing, which positive lock is may be secured by the connecting ring through a snap connection and a positive lock between cover and housing and connecting ring in the axial direction, preferably in the form of a bayonet connection. The individual possibilities can be executed in any way desired, but should be coordinated with each other in terms of their dimensions with regard to their function during assembly.

According to a first embodiment, the clutch housing has driver elements which may be situated at uniform intervals from each other in the circumferential direction and interact with cutouts in the cover that are executed complementarily to them. The cutouts in the cover extend in the circumferential direction and may be larger in size than the extension of the driver elements in the end region in the circumferential direction, but smaller than the total interval between a lateral face oriented in the circumferential direction and the same lateral face oriented in the circumferential direction of the adjacent driver element. First driver elements and second driver elements may be shaped by the different end regions. All driver elements have open-edge cutouts situated on lateral faces oriented in the same direction in the circumferential direction, forming a stop for the cover that acts in the axial direction. The first and the second driver elements may differ from each other in regard to the shaping of their respective second opposing lateral face. The first driver elements may be characterized by the shaping of a stop face facing in the circumferential direction for the cutout on the cover, while the second driver elements may have an open-edge cutout, again forming an axial stop face for the cover. The width of the open-edge cutout on the first lateral face corresponds at least to the thickness of the cover. The width of the cutout on the second lateral face corresponds at least to the thickness of the connecting ring. The connecting ring in the first embodiment may have cutouts situated in the circumferential direction in the area of the outer circumference, which are arranged at uniform intervals from each other and are designed complementary to the cutouts on the cover and the driver elements. The driver elements should also be able to extend through the cutouts in the connecting ring. The size of the extension in the circumferential direction of the cutouts in the connecting ring may be smaller than the sum of the distance from the driver element and the distance to the next driver element, but greater than the extension in the circumferential direction of a driver element. Different types of cutouts are provided in the connecting ring. In a first type of cutout, means are provided for realizing a snap connection, which may engage the cutout on the cover between the cover and the driver element of the housing. The second version of the cutout may be characterized by the fact that it is free of additional elements and merely forms a stop for the driver elements and hence braces the cover with the clutch housing in the axial direction. The third version of the cutouts may be characterized by the fact it is provided with torque limitation. In the simplest case, the torque limitation may be formed by a projection oriented in the axial direction, which likewise extends into the cutout in the cover and forms a stop face shaped in the circumferential direction, which is able to enter into an active connection with the cover. The means of realizing the snap connection and the torque limitation may be situated at the corresponding cutouts at different intervals in reference to the position of the cutout on the cover with respect to the driver elements, so that the stop face of the torque limiter may be spaced at an interval from the corresponding stop face on the cover when the snap connection is realized, and may takes effect only under increased load in idle mode, canceling the spring pre-tensioning in the snap connection in the cutout of the cover.

The cutouts on the cover element here form a stop in the circumferential direction. Preferably, all of them are situated at a common diameter.

A first embodiment may include the securing of two bayonet connections, a first bayonet connection acting in the circumferential direction between the cover and the clutch housing and a second bayonet connection produced in the axial direction between cover, clutch housing and connecting ring by a snap connection in the circumferential direction between cover and clutch housing and connecting ring. The snap connection in this case are an integral component of the connecting ring, and in addition serve to damp vibrations between clutch housing and cover in idle mode.

According to an especially preferred embodiment, the end regions may each extend in the axial direction. In this case an especially simple arrangement is possible. Assembly and disassembly in the axial direction may be greatly simplified.

According to a second embodiment, the driver elements may extend in the axial direction by analogy to the first embodiment. The cover has cutouts in the circumferential direction. At the same time, the driver elements may be designed differently. A first type of driver elements may be characterized by the fact that on their two lateral faces they each form a stop in combination with the surface areas of the cutouts in the cover oriented in the circumferential direction, and thus as it were form a positive lock in the circumferential direction as well as in the radial direction. The second driver elements may be characterized on one side by a stop face and on the other by a cutout into which projections of the connecting ring that are oriented in the radial direction can be inserted, so that a bracing in the axial direction between the cover and the clutch housing is realized.

Means of realizing a snap connection may be provided at a same diameter or a different diameter on the connecting ring, in particular at least one elastically springing projection which is able to engage a slot on the cover, with the fixing in the circumferential direction being realized by the engagement in the slot on the cover, and at the same time at least one projection is brought into a position in the radial direction on the connecting ring in which it partially engages the cutout on the second driver elements and thereby braces the clutch housing and the cover. In the second version, the snap connection may ensures the positive lock in the circumferential direction between cover and clutch housing and the bayonet connection to realize a positive lock in the axial direction between clutch housing and cover.

In both cases, a damping of vibrations between clutch housing and cover can be achieved through the snap connection, in particular the elastic elements of the snap connection.

The various embodiments of the invention may be suitable for clutch assemblies of a great variety of types. These may be clutch assemblies with one clutch, or an especially preferred version in the form of double clutches.

BRIEF DESCRIPTION OF THE DRAWINGS

Embodiments of the invention will be explained below on the basis of figures. They depict the following details:

FIG. 2c: shows a detail from a perspective view of a driver module according to FIG. 2a;

DETAILED DESCRIPTION

Figure 1A:
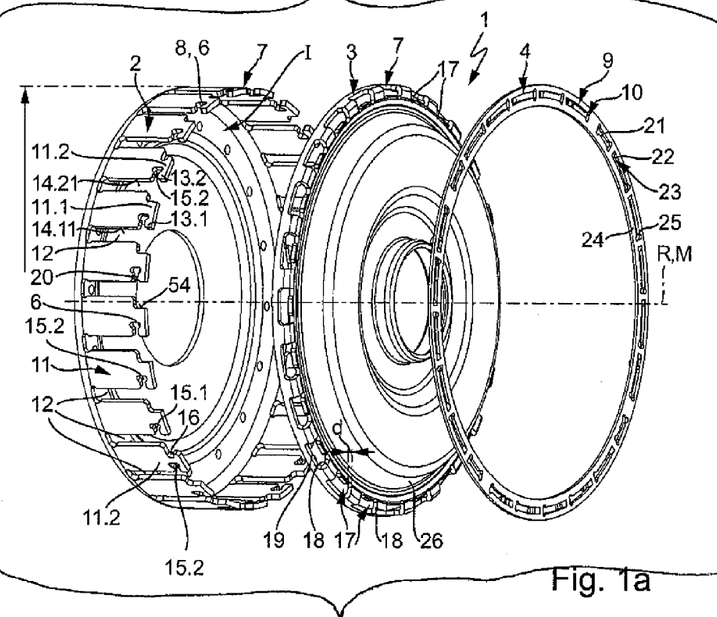
FIG. 1a: shows the individual elements of a driver module according to the invention on the basis of an exploded view.

FIG. 1a shows an exploded view of a version designed according to the invention of a driver module 1 for clutch assemblies, in particular wet-running double clutch assemblies, according to a first embodiment of the invention. The driver module 1 is executed in three parts. It includes a clutch housing 2, which is also referred to as a clutch cage, and a cover 3, which in the assembled state enclose an interior space I to receive the clutch assembly. Also provided is a connecting ring 4, which is involved in the connection between the clutch housing 2 and the cover 3 and which serves to secure the cover 3 on the clutch housing 2 in the axial direction and the circumferential direction. According to the first embodiment of the invention, clutch housing 2 and cover 3 are designed so that when they are joined free of the connecting ring 4, there is a fixing in the axial direction with free play, and under load conditions, in particular with a piston assembly operated by a pressure medium is braced on the cover 3, without play, in that a positive lock with play is produced in the axial direction between the clutch housing 2 and the cover 3, and the cover is driven in the load direction, for example with the clutch actuated around the axis of rotation R, which corresponds to the center axis M of the individual components clutch housing 2, cover 3 and connecting ring 4, while after the connecting ring 4 is installed the latter takes over the locking between the clutch housing 2 and cover 3 in the circumferential direction and the axial direction. The connection between the cover 3 and the clutch housing 2 in the state secured by means of the connecting ring 4 is rotationally fixed in both directions, with the rotationally fixed connection being without play in the axial direction, and preferably also without play in the circumferential direction. To that end, the cover 3 and the housing 2 are positively coupled by means of a bayonet connection 52, while the connecting ring 4 secures the connection between cover 3 and housing 2 in the circumferential direction by means of a bayonet connection 5 and a snap mechanism 53, and fixes it at least indirectly in the axial direction.

Figure 1B:
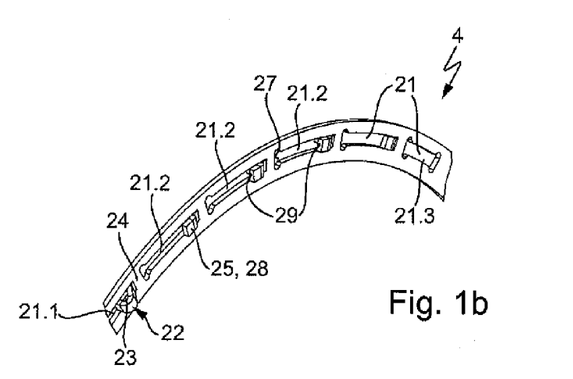
FIG. 1b: shows detail of a perspective view of a connecting ring.
Figure 1C:
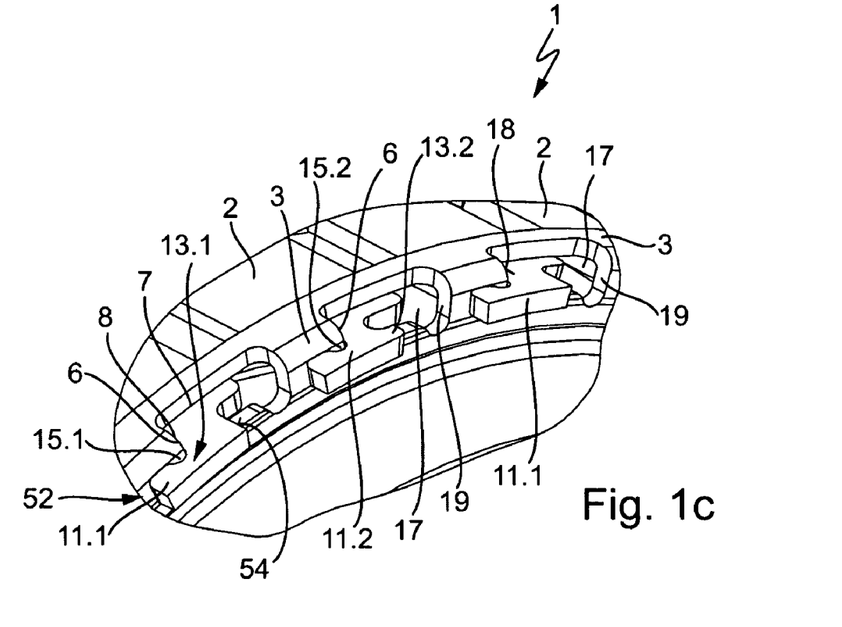
FIG. 1c: shows the condition of the connection between the clutch housing and the cover based on the perspective view of FIG. 1b.

After the cover 3 is installed on the clutch housing 2, these parts are positively joined together according to FIG. 1c with free play in the axial direction and forming at least one stop 6 in the circumferential direction. The connecting ring 4 is positively coupled with the cover 3 in the circumferential direction and positively coupled with the clutch housing 2 in the axial direction. The individual connections are realized through appropriate means on the individual elements cover 3, connecting ring 4 and clutch housing 2. Means 7 are provided between cover 3 and clutch housing 2 for realizing a positive lock in the axial direction with free play. Furthermore, means 8 are provided for producing a stop 6 in one direction in the circumferential direction between cover 3 and clutch housing 2. These means 7 and 8 serve to realize the bayonet connection depicted in FIGS. 1c and 1d. In addition, means 9 are provided on connecting ring 4 to realize a positive lock in the circumferential direction between connecting ring 4 and cover 3, and in addition means 10 to realize an axial securing between cover 3 and clutch housing 2. These means can vary in design. FIGS. 1a through 1g show an especially advantageous arrangement. The individual component cover 3, clutch housing 2 and connecting ring 4 are situated coaxially to each other. The specifications of direction, in particular with regard to the circumferential direction, refer to the axis of rotation R, which corresponds to the center axis M of these components in the installed position. Clutch housing 2 is of bowl-shaped design, and encloses a possible clutch assembly in the radial and at least partially in the axial direction while forming the interior space I. The clutch housing 2 is formed primarily by a disk-shaped or bowl-shaped element, on whose outer circumference $d_A$ driver elements 11 are situated, distributed in the circumferential direction, which are situated at a uniform distance from each other in the axial direction, for example, parallel to the axis of rotation, and preferably in the circumferential direction. The uniform arrangement offers the advantage that no special position assignments need to be used between the clutch housing 2 and the cover 3, since uniform configurations can be used here to produce the connection. The driver elements 11 are also called fingers. The clutch housing has at least two different types of driver elements 11.1 and 11.2. In their positioning relative to each other, the driver elements 11.1 and 11.2 form intermediate spaces 12 at intervals in the circumferential direction, which are oriented in the axial direction in reference to the axis of rotation R and parallel to the center axis M. The design of the driver elements 11.1 and 11.2 differs in the shape of their end regions 13.1 and 13.2. Driver elements 11.1 and 11.2 can be situated alternating in the circumferential direction, or else driver elements 11.1 may be provided in greater numbers than driver elements 11.2, with the arrangement preferably being symmetrical. The driver elements 11.1 and 11.2 form hook-shaped ends in their end regions 13.1 and 13.2. These hook-shaped ends make it possible to form the stops 6 in the circumferential direction. The stop 6 is effective in this case in one direction in the circumferential direction, that is, in one direction of rotation in reference to the axis of rotation R, which corresponds to the center axis M of the elements. To that end, the individual driver elements 11.1 and 11.2 have open-edge cutouts 15.1 and 15.2 respectively on their lateral faces 14.11 and 14.21 respectively oriented in the same direction in the circumferential direction. The open-edge cutouts 15.1 and 15.2 extend in the circumferential direction, and with their inside surface facing in the circumferential direction form the stop 6 in the circumferential direction for one direction of rotation. Preferably such cutouts 15.1 and 15.2 are provided on each of the driver elements 11.1 and 11.2. Surface areas that differ from 14.11, 14.21 are realized on the lateral faces 14.12 and 14.22 of the respective driver elements 11.1 and 11.2 facing in the opposite direction of rotation. The end region 13.1 of the driver elements 11.1 on the lateral face 14.12 is characterized here by a surface in the end region of the driver element 11.2 oriented in the circumferential direction, which can also function as a stop face 54 in the circumferential direction. Open-edge cutouts 16 are also provided on the lateral face 14.22 of the driver elements 11.2, which are oriented in the circumferential direction but are contrary to the cutouts 15.2. These second open-edge cutouts 16 serve to interact with the connecting ring 4, while the first open-edge cutouts 15.1 and 15.2 serve to form the connection between the cover 3 and the clutch housing 2.

The cover 3 has passage openings 17, which extend in the circumferential direction in an arc over part of the extent of the cover, there being a plurality of such passage openings 17 provided. The individual passage opening 17 serves to realize the positive connection with the clutch housing 2. To that end, the passage openings 17 are situated at a diameter that corresponds to the diameter of the arrangement of the driver elements 11.1 and 11.2, the driver elements 11.1 and 11.2 preferably being situated at one diameter, and all passage openings accordingly also. The positive connection between the clutch housing 2 and the cover 3 takes place through the linkage into the driver elements 11.1 and 11.2 with the cover 3, in particular through the passage openings 17. To that end, the driver elements 11.1 and 11.2 are passed through the passage openings 17. The extension of the passage openings 17 in the circumferential direction is chosen so that it is in any case larger than the extension of the driver elements 11.1, 11.2 in the circumferential direction. The driver elements 11.1, 11.2 with the cutouts 15.1, 15.2 and the passage openings 17 on the cover form the means 7 of realizing a positive connection in the axial direction between cover 3 and clutch housing 2 with free play. To that end, the width b of the open-edge cutout 15.1 or 15.2 is greater than the thickness d of the cover 3 in the area of connection. For assembly, cover 3 and clutch housing 2 are situated coaxially to each other and with one pushed into the other, so that the driver elements 11.1 and 11.2 extend through the passage openings 17. The insertion into each other here in the axial direction can be limited from the outset by the fact that the design of the driver elements 11.1 and 11.2 before the end region 13.1, 13.2 includes corresponding longer extension in the circumferential direction, while forming stops in the axial direction that prevent pushing the cover 3 farther. The cover 3 is pushed in far enough so that it is in the same plane in the circumferential direction as the open-edge cutouts 15.1 and 15.2 on the driver elements 11.1 and 11.2. Cover 3 is then twisted relative to clutch housing 2, or clutch housing 2 relative to cover 3, so that the intermediate space between the through passages 17 of cover 3 is slid into the open-edge cutouts 15.1 and 15.2, and a stop face 18 formed in the circumferential direction on the passage opening 17, which is constructed opposite the stop 6 in the open-edge cutout 15.1 or 15.2, makes contact. That ensures the stop in the circumferential direction in a rotational direction, while fixing in the axial direction is possible because of the cover 3 being received in the open-edge cutouts 15.1 and 15.2, and there being play present here depending on the width of the cutout relative to the thickness d of the cover 3. To that end, the surface 19 that forms the stop 6 is designed as a flat surface, which should always be in contact with the stop face 18, in order to reduce the surface contact pressure resulting from the introduction of machine torque. Furthermore, the contact between cover 3 and clutch housing 2 in the area of the stop faces 18 and 6 reduces the axial movability between the latter. That means that a virtual friction locking is produced between the latter. Opposite the stop face 18 on the passage opening 17, the stop face 19 is formed. If the clutch inside the driver module 1 is actuated, the actuating force acts against the clutch cover 3, which in turn acts against the surface 20 of the open-edge cutout 15.1 or 15.2 which is oriented in the axial direction, for example, the surface 20 is directed toward cover 3 and away from clutch housing 2.

But in order to realize the most rotationally fixed connection possible even at idle, with little noise and sound propagation, connecting ring 4 is provided in addition, which reduces or completely eliminates the movability in the opposite direction, for example, contrary to the torque delivered by the driving engine, for example, in the idle direction. This is a ring-shaped element with cutouts 21, which are provided in the circumferential direction on the cover 3, preferably at uniform intervals. The cutouts 21 are passage openings 21, which extend in the circumferential direction around part of the circumference and are complementary in form to the passage openings 17 or to the driver elements 11.1 and 11.2. The connecting ring 4 adjoins the cover 3 in the axial direction, securing the cover 3 in relation to the clutch housing 2 in the other second direction of rotation in the circumferential direction, which is oriented opposite the first. The passage openings 21 are a component of the means 10 for realizing an axial securing between cover 3 and housing 2, in particular by a positive lock, which is produced by a bayonet connection 5 between cover 3, connecting ring 4 and clutch housing 2. In addition, means 22 of realizing a snap connection are provided. These include at least one first spring element 23, which is situated on the face 24 of the connecting ring 4 that faces the cover 3 in the installed position. In addition, means 25 of limiting the torque are provided. The spring element 23 and the means 25 here are preferably integral components of the connecting ring 4. If connecting ring 4 is pressed against clutch cover 3, connecting ring 4 is guided between the driver elements 11.1 and 11.2 on clutch housing 2. The driver elements 11.1 and 11.2 likewise penetrate as it were the cutouts or passage openings 21 with their end regions 13.1 and 13.2. At the same time the spring element 23 acts against the surface 26 and slides into the cutout or passage opening 17 on the cover 3 and acts against the surface 19 of the passage opening 17 facing in the circumferential direction, which lies opposite the contact face 18. If the connecting ring 4 is pushed in further and reaches the bottom of the cover 3, the force that is produced by the pre-tensioning of the spring causes the adjacent through passage 21, viewed in the circumferential direction, to slide into the cutout 16 on driver element 11.2, and as it were to bring about with the latter an interlocking between the cover 3 and the housing 2 in the axial direction. Connecting ring 4 thus brings about a securing in the axial direction through the bayonet connection 52, between connecting ring 4 and cover 3 of the resulting position coordination in the circumferential direction between the adjacent cutouts or cutout openings 21, with respect to the driver elements, in particular the driver elements 11.2. It must be kept in mind here that the widths of the individual driver elements 11.1 and 11.2 need to be matched to this type of connection. That also applies to the design of the cutouts and passage openings 21 or 17 and 15.1 and 15.2, in order to realize a driver module 1 here that is free of play. As explained earlier, Figure 1a shows the design of the individual elements in an exploded view. Figure 1b illustrates a detail of a connecting ring 4. One can recognize here the cutouts 21 or passage openings that penetrate the ring in the circumferential direction. A differentiation is made between passage openings 21.1 with the means 22, passage openings 21.2, which are provided with means 25, and in addition another type of passage openings 21.3, which preferably are executed with a smaller extension than the other passage openings 21.2 and 21.1 and whose design is laid out to receive the driver elements 11.2. Preferably, the arrangement is correspondingly symmetrical among the various types, regarded over the entire circumference. The passage openings 21.3 interact here only with the driver elements 11.2, while the driver elements 21.1 and 21.2 interact with the driver elements 11.1. Attention must be paid here to ensure that the design of clutch housing 2 with driver elements 11.1 and 11.2 is matched with the design of connecting ring 4, so that the corresponding passage openings 21.1 or 21.2 are also positioned opposite the individual driver elements 11.1 here, and a corresponding passage opening 21.3 on ring 4 opposite the driver element 11.2. Only a single spring element 23 can be provided here, while preferably a symmetrical design distributed around the circumference is chosen and at least two spring elements 23, which are positioned symmetrically on connecting ring 4, are provided as means of realizing a bayonet connection. This applies by analogy to the driver elements 11.2 on clutch housing 2 and the passage openings 21.3 on connecting ring 4. The means 25 of limiting the torque, in the form of a ramp 28, can be assigned to a majority of driver elements 11.1. Here the ramp on connecting ring 4 is designed so that it extends as a projection from the passage opening 21.2 in the axial direction and forms a stop face 29 in the circumferential direction, which takes effect between cover 3 and clutch housing 2 or on cover 3 on the stop surfaces 19 when connecting ring 4 or an element of the linkage between cover 3 and clutch housing 2 is twisted in the circumferential direction, or takes effect on cover 3 at the contact faces 19. The ramp 28 can be provided, but does not absolutely have to be. This offers the advantage, however, that the ramp comes into play at elevated torques in idle mode, and thereby prevents a relative movement here between the individual elements cover 3 and clutch housing 2.

FIG. 1c uses a detail from a perspective view of the connection between cover 3 and clutch housing 2 to illustrate the positive connection between them. One can recognize the two different driver elements 11.1 and 11.2 with different end regions 13.1 and 13.2, which extend through the passage openings 17, and after twisting cover 3 in relation to the cutouts 15.1 and 15.2, which are open-edged in the circumferential direction, secure cover 3 in the circumferential direction in one direction, in that the stop face 6 enters into an operative connection with the surface 18, or the stop face 18 makes contact with the stop face 6 on the respective driver element 11.1, 11.2. Furthermore, driver element 11.1 or 11.2 clasps cover 3 in the area between the passage openings 17 with its end region 13.1 or 13.2 in the form of a hook, or in a complete view in the form of a pincer. A transfer of torque is possible here only in one direction, namely in the rotational direction of the housing 2 in the direction of the orientation of the stop face 6. In the case of rotary motion in the opposite direction there would no longer be axial securing between cover 3 and housing 2. This axial securing is preferably realized with free play, but conceivably also without free play or merely with a clearance fit for assembly purposes between cover 3 and clutch housing 2, by means of the differing widths of the cutouts 15.1 and 15.2 in the axial direction and the thickness d of the cover 3. FIG. 1c illustrates the view after cover 3 and clutch housing 2 have been brought together, where they have already been twisted into the stop position in the circumferential direction.

Figure 1D:
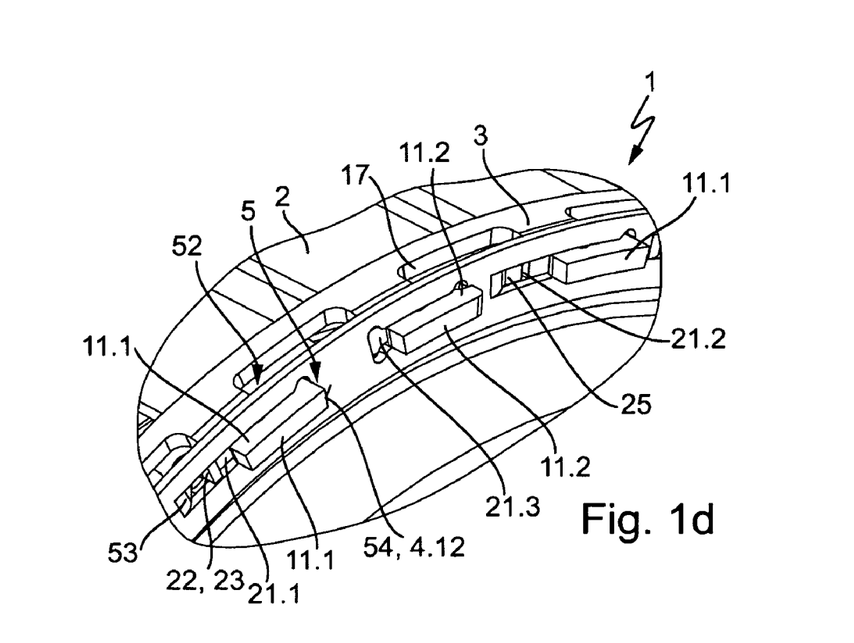
FIG. 1d: shows a detail of the driver module after installation of the connecting ring on the basis of a perspective view according to FIG. 1c.
Figure 1E:
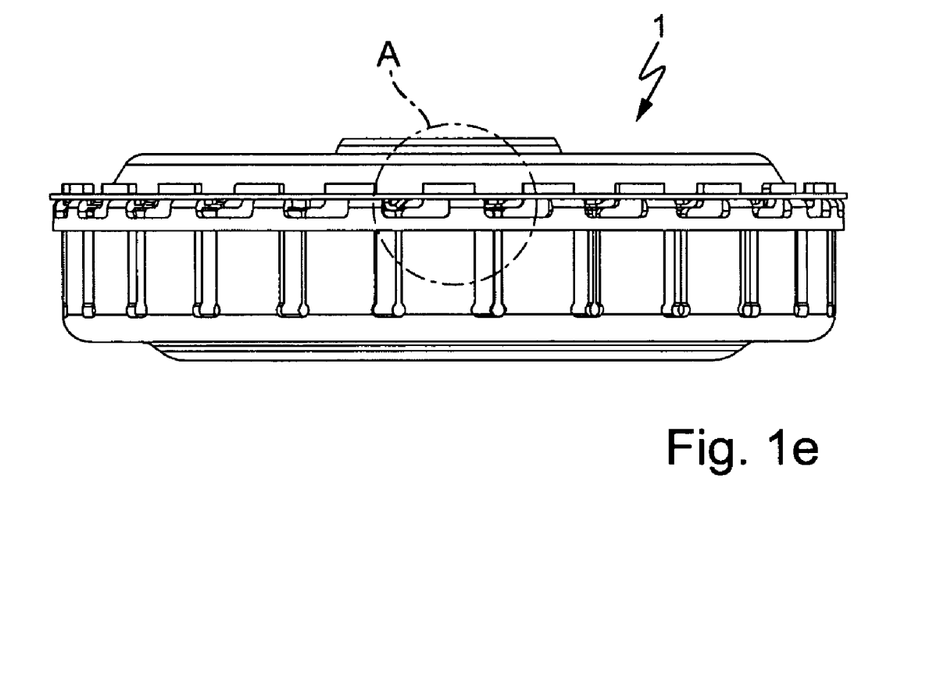
FIG. 1e: shows a view of the installed driver module from above.
Figure 1F:
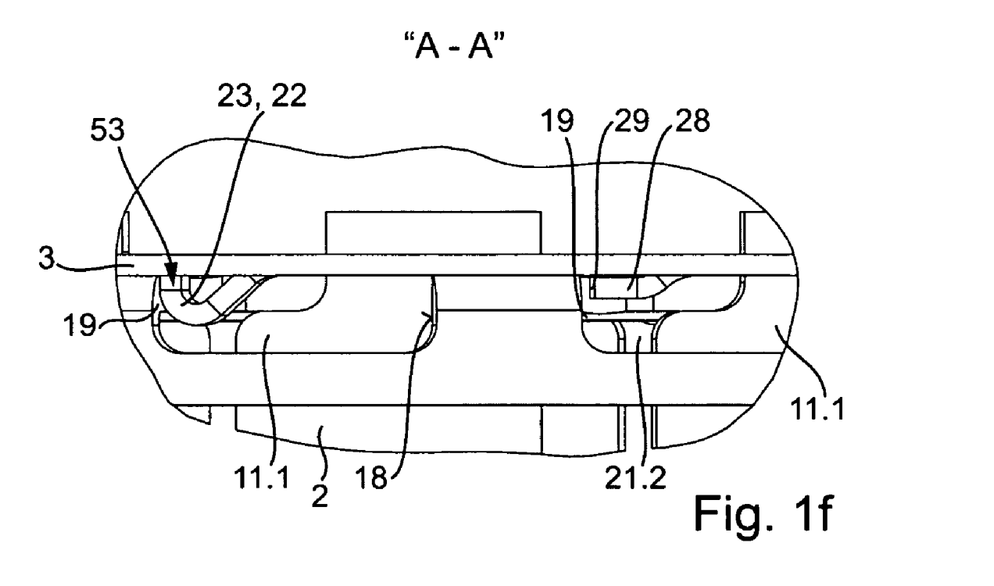
FIG. 1f: shows an enlarged detail from a view from above according to FIG. 1e.

FIG. 1d uses a perspective view of a detail from a depiction of the assembly of clutch 2, cover 3 and connecting ring 4 to illustrate the assembled state. FIG. 1e illustrates a depiction of a view from above according to FIG. 1d, and FIG. 1f illustrates a detail A in enlarged depiction from FIG. 1e, of driver module 1 in the installed state. One can recognize here the driver elements 11.1 and 11.2, which penetrate the corresponding passage openings 21.1 through 21.3. Here driver element 11.1 has its lateral face 4.12 which faces away from the open-edge cutout 15.1 resting as stop surface 54 on surface 27 of passage opening 21.1, which faces and is oriented in the circumferential direction toward the latter. Spring element 23, which is situated in the area of the cutout or passage opening 21.1, extends into cover 3. In this position it is apparent that spring element 23 is braced in the axial direction in a surface of the cutout 17 on cover 3 that is oriented in the circumferential direction. In this position it is also possible to see the ramps 28, which extend in the axial direction in the installed position. However, the stop faces 29 of the latter are spaced at a distance from the cutout 17, or from the corresponding surface 19 on cover 3 oriented in the circumferential direction. This assembly situation represents the normal case during normal operation when transmitting torque. But if an idle-mode torque is introduced into driver module 1, ramp 28 takes effect by acting against cover 3 or forming a stop for the latter.

Figure 1G:
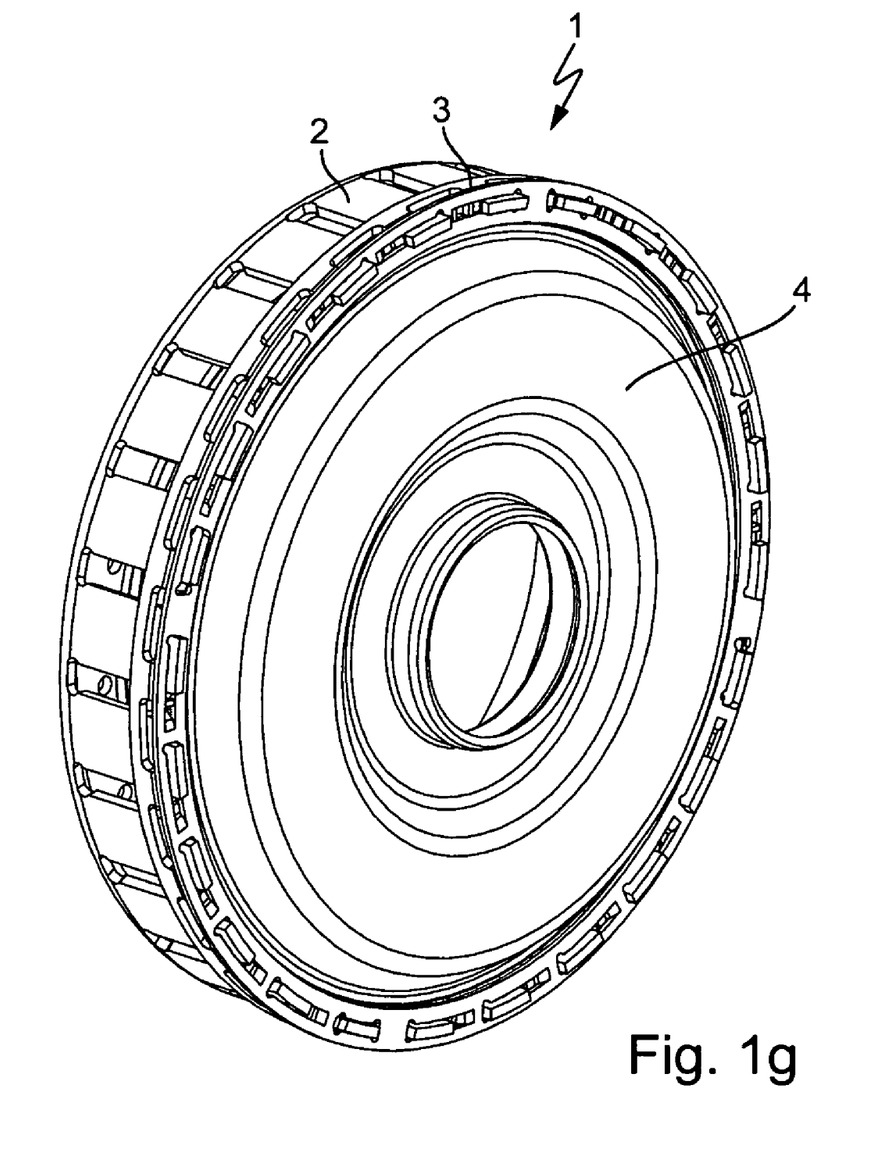
FIG. 1g: shows a perspective view of an assembled driver module.

FIG. 1g illustrates an assembly depiction of the entire driver module 1.

FIGS. 2a through 2d illustrate another second embodiment of a driver module 1.2 according to the invention, for realizing a connection between a cover 3.2 and a clutch housing 2.2 by means of a connecting ring 4.2. In this case too, a positive connection is realized between clutch housing 2.2 and cover 3.2, which is secured in the axial and circumferential directions by means of a connecting ring 4.2. Here too, means 30 are provided for realizing a positive connection in the circumferential direction between cover 3.2 and clutch housing 2.2. The fixing in the axial direction is realized essentially by means of a bayonet connection 31 between clutch housing 2.2, cover 3.2 and connecting ring 4.2. The fixing in the circumferential and axial directions is accomplished by means of the snap connection 32.

Figure 2A:
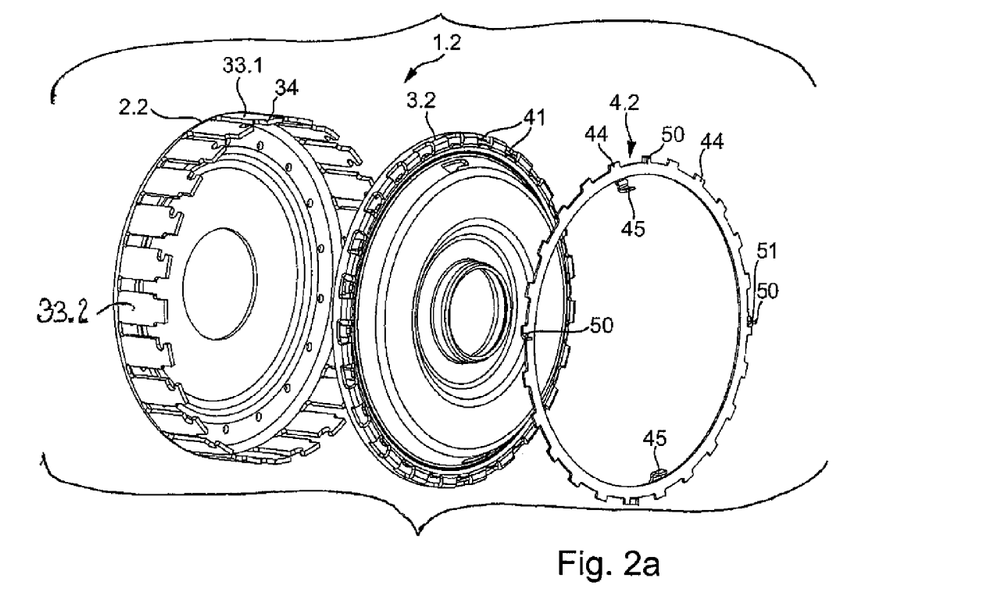
FIG. 2a: shows a possible second version of a driver module according to the invention on the basis of an exploded view.

FIG. 2a illustrates the execution of the individual components in an exploded depiction. One can recognize the clutch housing 2.2 here, which is essentially formed as a disk-shaped element, with the driver element situated in the area of the outside circumference and extending in the axial direction. The driver elements are formed here by projections protruding in the axial direction, which are arranged at an interval from each other in the circumferential direction. The driver elements have an end region, which serves to realize the positive connection with the cover 3.2. Clutch housing 2.2 has two different types of driver elements 33.1 and 33.2 which differ essentially by the design of their end regions 34.1 and 34.2. A first end region 34.1 of the driver elements 33.1 is designed so that it has a hook-shaped form, analogous to that described in FIG. 1a for driver element 11.1. This means that on one lateral face 35.12 open-edge cutouts 36 are provided, which extend in the circumferential direction, and that on the opposite lateral face 35.11 of driver element 33.1 only a stop face 37 is provided. The second driver element 33.2 is characterized in that it has a preferably symmetrical projection 38 on the end region 34.2, for example, it forms two stop faces 39 and 40 as it were, seen in the circumferential direction, which are oriented opposite each other in the circumferential direction on the lateral faces 35.21 and 35.22. The cover 3.2 has a number of cutouts 41 that complement these, through which the end regions 34.1 and 34.2 of the driver elements 33.1 and 33.2 can be guided. Contrary to the solution depicted in FIG. 1, the torque introduced by means of the driving engine and the idle mode torque are realized through the contact surface 42 between the clutch housing driver elements 33.1, 33.2 and the cover 3.2. Here the stop faces 37 and 39 enter into operative connection with the respective contact surfaces 42 of the cutouts 41, and for the driver elements 33.2 the stop faces 40 connect with the contact surface 43 on the cutout 41. A rotationally fixed connection in the circumferential direction in both directions is realized in particular by means of the driver elements 33.2, while preferably the width of end region 34.2 corresponds to the width of the cutout 41, viewed in the circumferential direction, so that there is an extensive application, if possible with a precision of fit in the range of no more than a clearance fit. The stop face 37 on the driver element 33.1 is effective here in only one direction of rotation. The drive torque is introduced through the driver elements 33.1 and 33.2 for the stop faces 37 or 39 in the contact surfaces 42 on the cover 3.2, while the idle mode torque is applied by means of the driver element 33.2 on the stop surface 40, interacting with the contact surface 43 in the cover 3.2, and vice versa. The positive connection 30 in the circumferential direction is fixed in the axial direction by means of the connecting ring 4.2. The latter has projections 44 oriented in the radial direction, which are situated at uniform intervals from each other in the circumferential direction, and which are smaller in width than the intervals in the circumferential direction between two sequential cutouts 41 in the cover 4.2.

The cutouts 36 on the driver elements 33.1, which extend on the lateral face 35.12 of the latter in the circumferential direction, are dimensioned in the axial direction in reference to the axis of rotation R so that the latter corresponds to at least the width of the cover 3.2 and the connecting ring 4.2 in the axial direction, so that the connecting ring 4.2 can be twisted into the cutout 36, and thus enables fixing in the axial direction between cover and housing 3.2 and 2.2 by means of a bayonet connection 31. Furthermore, in the area of such a projection a spring element 45 is provided, which serves to realize a snap connection 55. This interacts with a slot 46 formed in the cover 3.2 in the circumferential direction, so that fixing is possible here in the circumferential direction. The slot 46 is characterized by two regions, a first region 47 and a second region 48, with the second region 48 forming a stop 49 in the circumferential direction for the spring element 45.

Figure 2B:
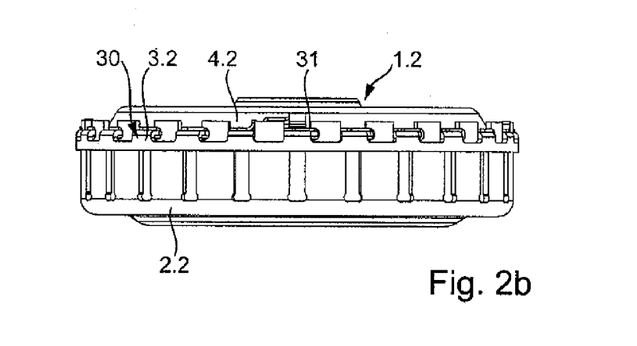
FIG. 2b: shows a view from above of a driver module according to FIG. 2a in the assembled state.
Figure 2C:
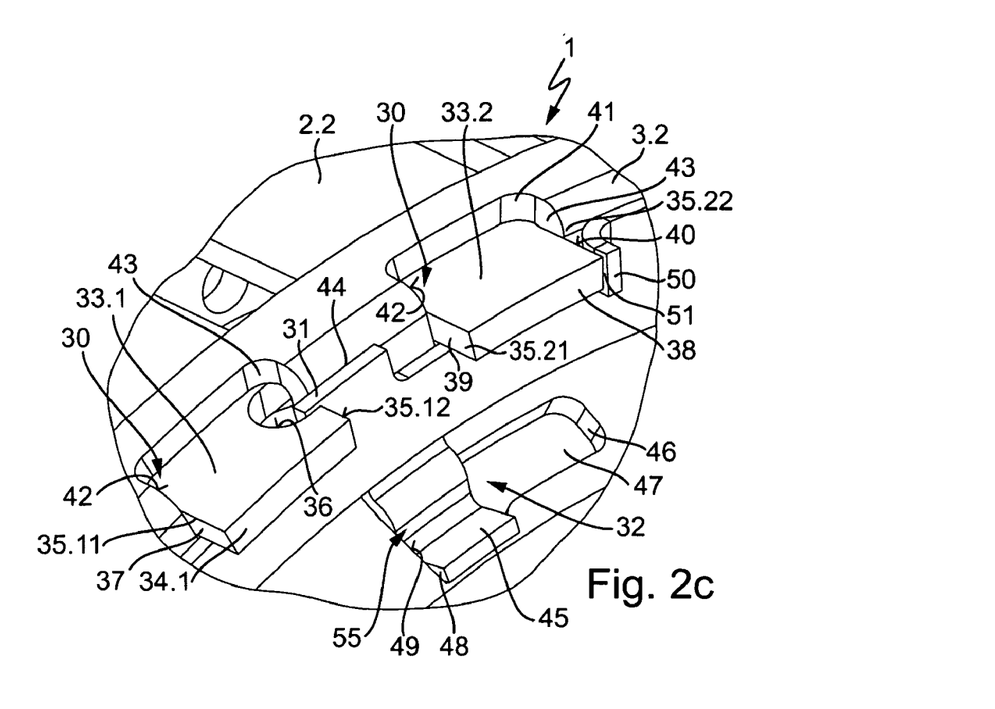

FIG. 2b illustrates a perspective view of the driver module in the already assembled state, on the basis of a detail of the latter. Additional spring elements 50 are also provided on the ring 4.4, which serve to eliminate sounds during operation, in particular at idle.

The spring elements 45 and the matching slots 46 are preferably arranged symmetrically in reference to the connecting ring 4.2. Preferably, at least two such spring elements 45 and two such slots 46 are provided in the cover 3.2. It would also be conceivable to have a plurality of such spring elements, but in particular limited in number for ease of disassembly. By analogy, these statements also apply to the additional spring elements 50. These are likewise situated on the outer circumference of the connecting ring 4.2, the arrangement being such that they form a stop face 51 in the circumferential direction for the driver element 33.2 with the stop face 40, that is, in the idle direction.

Figure 2D:
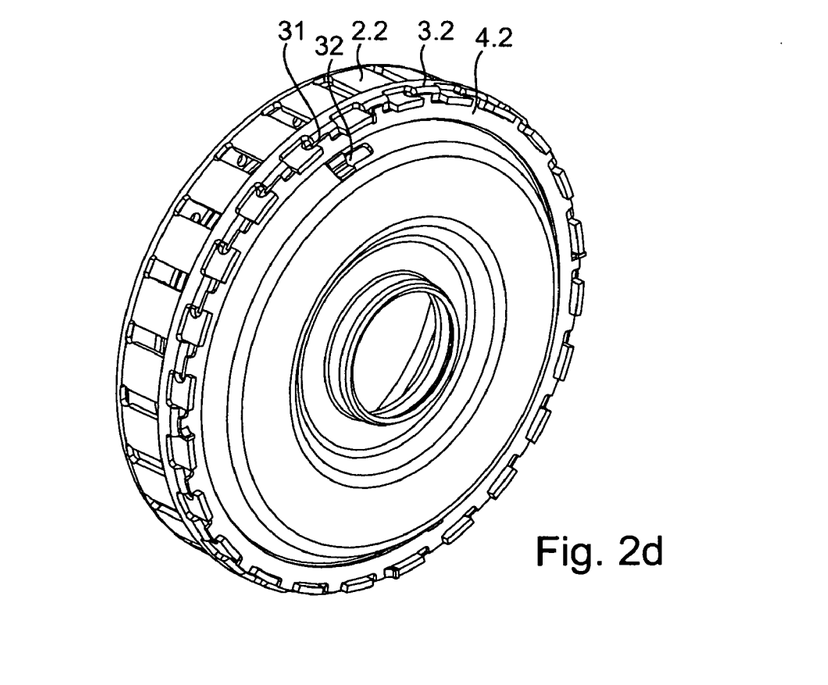
FIG. 2d: shows the assembled driver module in perspective view.

FIG. 2d illustrates a driver component 1.2 according to the second embodiment, in the assembled state. In all of the embodiments, the crucial thing is however that there be appropriate matching among the individual driver elements, cutouts and stop faces, in order to achieve the desired effect. The number of driver elements 33.1 and 33.2 with corresponding cutouts 36 or free thereof, to realize a single-sided or a two-sided contact with the cover 3.2 in the circumferential direction, is preferably determined on the basis of the necessary surface pressures and of the torque calculations, in order to fulfill the power and availability requirements. Similar to the solution illustrated in FIG. 1, the connecting ring 4.2 is used to fix the components in the axial direction, in order to raise an opposing force to the clutch actuating force and to prevent noise and rattling between the clutch housing 2.2 and the cover 3.2. To that end, this connecting ring has a plurality of features that help to achieve this function. First the cover is connected to the clutch housing 2.2, with the connecting ring then being added in the axial direction. The projections 44 in the radial direction are placed between the individual clutch housing and driver elements and the spring element 45 is inserted into the slot which is situated in the cover element 3.2. The connecting ring 4.2 is then pressed against the face of the cover that is turned away from the clutch housing 2.2, and is twisted, so that the projections 44 move into the cutouts 36 between cover 3.2 and clutch housing 2.2. As soon as the connecting ring is twisted into a position in which the cutouts are reached by the projections 44, the spring element 45 expands into the larger region 48 of the slot 46 on the clutch cover 3.2. This locks the connecting ring 4.2 in its position and prevents further twisting. If the clutch is operated, the actuating force acts against the cover 3.2, then through the connecting ring contact surface to the clutch housing driver elements 33.1. An additional spring element 50 eliminates the noise between the cover 3.2 and the clutch housing 2.2 by creating an opposing force against the driver elements 33.2 between the cover 3.2 and the clutch housing 2.2, as soon as the ring 4.2 is locked in the slot and a tensioning is realized thereby between the clutch housing 2.2 and the cover 3.2.

REFERENCE LABELS 1 driver module
2 clutch housing
3 cover
4 connecting ring
5 bayonet connection
6 stop
7 means of realizing a positive connection in the axial direction between cover and housing, with free play
8 means of producing a stop in the circumferential direction
9 means of realizing a positive connection in the circumferential direction
10 means of realizing an axial securing between cover and housing
11 driver elements
11.1, 11.2 driver element
12 intermediate space
13.1, 13.2 end region
14.11, 14.12 lateral face
14.21, 14.22 lateral face
15.1, 15.2 cutout
16 open-edge cutout
17 passage opening
18 stop face
19 stop face
20 surface
21 cutout/passage opening
21.1, 21.2, 21.3 passage opening
22 means of realizing a snap connection
23 spring element
24 face
25 means of limiting torque
26 surface
28 ramp
29 stop face
30 means of realizing a positive connection in the circumferential direction between cover and clutch housing
31 bayonet connection
33.1, 33.2 driver element
34.1, 34.2 end region
35.1, 35.2 lateral face
36 open-edge cutout
37 stop face
38 projection
39 stop face
40 stop face
41 cutouts
42 contact surface
43 contact surface
44 projection
45 spring element
46 slot
47 first region
48 second region
49 stop
50 spring element
51 stop face
52 bayonet connection
53 snap mechanism
54 stop face
55 snap connection
b width
d thickness
R axis of rotation
M center axis

What is claimed is:

1. A driver module for clutch assemblies comprising:
a clutch housing; and
a cover, the clutch housing and the cover being connected with each other, enclosing an interior space for receiving the clutch assembly, wherein the cover is secured on the clutch housing by a connecting ring, the connecting ring including elastic elements pretensioning the connection between the cover and clutch housing in the circumferential direction.

2. The driver module as recited in claim 1 wherein the clutch assembly is a wet-running double clutch assembly.

3. The driver module as recited in claim 1 wherein the cover is secured on the clutch housing by the connecting ring in the axial direction and in the circumferential direction.

4. The driver module as recited in claim 1 wherein the connection between the cover and the clutch housing by the connecting ring is rotationally fixed and free of play in the axial direction and/or circumferential direction.

5. The driver module as recited in claim 4 wherein the elastic elements are formed by the snap connection.

6. The driver module as recited in claim 1 wherein the cover and the clutch housing can be twisted relative to each other in the circumferential direction by a limited amount.

7. The driver module as recited in claim 1 further comprising between the cover and the clutch housing a first and second means, the first means providing a positive connection in the axial direction with free play, and the second means providing a stop in the circumferential direction.

8. The driver module as recited in claim 7 wherein the connecting ring is connected with the cover in a rotationally fixed connection in the circumferential direction by a snap connection, the cover being braced against the clutch housing in the axial direction by the positive connection.

9. The driver module as recited in claim 8 wherein the positive connection between the cover and the clutch housing in the axial direction is formed by a bayonet connection.

10. The driver module as recited in claim 1 further comprising between the cover and the clutch housing, means providing a positive connection in the circumferential direction.

11. The driver module as recited in claim 10 wherein the connecting ring is connected with the cover in a rotationally fixed connection in the circumferential direction by a snap connection, the cover being braced against the clutch housing in the axial direction by the positive connection.

12. The driver module as recited in claim 11 wherein the positive connection between the cover and the clutch housing in the axial direction is formed by a bayonet connection.

13. The driver module as recited in claim 11 wherein the connecting ring has a snap connection interacting with a complementary slot in the cover.

14. A driver module for clutch assemblies comprising:
a clutch housing;
a cover, the clutch housing and the cover being connected with each other, enclosing an interior space for receiving the clutch assembly, wherein the cover is secured on the clutch housing by a connecting ring; and elastic elements pretensioning the connection between the cover and clutch housing in the circumferential direction; and
a first means and a second means between the cover and the clutch housing, the first means providing a positive connection in the axial direction with free play, and the second means providing a stop in the circumferential direction wherein the clutch housing has a first and a second driver element, the first and second driver elements being arranged at uniform intervals from each other in the circumferential direction in an outer circumference, the first and second driver elements having different end regions that interact with complementary cutouts in the cover extending in the circumferential direction, the cutouts having a greater extension in the circumferential direction than the extension of the end regions of the driver elements in the circumferential direction, the driver elements having a first lateral face and an opposite lateral face, the first lateral face being oriented in the circumferential direction in a same direction, open-edge cutouts extending in the circumferential direction receiving the cover, the opposite lateral faces of the first driver elements having a stop face for a cutout on the cover and the opposite lateral faces of the second driver elements having an open-edge cutout receiving the connecting ring.

15. The driver module as recited in claim 14 further comprising the connecting ring having cutouts complementary to the cutouts in the cover, the cutouts of the connecting ring being arranged uniformly in the circumferential direction, wherein the cutouts of the connecting ring are larger than the extension of the driver elements in the circumferential direction, but smaller than the total distance between two driver elements, the connecting ring having a third means providing a snap connection operatively connecting the cutouts with the matching cutout in the cover.

16. The driver module as recited in claim 15 wherein the matching cutout in the cover is formed by a cutout arranged in the circumferential direction and penetrated by driver elements.

17. The driver module as recited in claim 15 further comprising the third means providing the snap connection having at least one spring element, the spring element being oriented in the axial direction but acting in the circumferential direction.

18. The driver module as recited in claim 14 further comprising a ramp forming a torque limitation, the ramp being formed by a projection oriented in the axial direction and extending into the cutouts in the cover in the installed position, the ramp having a stop face oriented in the circumferential direction, which can be operationally connected with a stop face in the cover.

19. The driver module as recited in claim 14 wherein the driver elements and the cutouts in the cover and the connecting ring are located at one diameter.

20. The driver module as recited in claim 14 wherein the driver elements extend in the axial direction, and the connecting ring and the cover are disk-shaped elements.

21. A driver module for clutch assemblies comprising:
a clutch housing;
a cover, the clutch housing and the cover being connected with each other, enclosing an interior space for receiving the clutch assembly, wherein the cover is secured on the clutch housing by a connecting ring; and elastic elements pretensioning the connection; between the cover and clutch housing in the circumferential directionp; and
means between the cover and the clutch housing providing a positive connection in the circumferential direction
wherein the clutch housing has driver elements arranged at uniform intervals from each other in the circumferential direction in the-outer circumference, the driver elements having different end regions forming first driver elements and second driver elements, the first driver elements each forming a stop face in the circumferential direction on the lateral faces, the stop face acting together with complementary surfaces on a cutout in the cover, and the second driver elements having only one stop face operating in the circumferential direction, while on the opposing lateral faces of the second driver, a cutout is provided for at least partial introduction of the connecting ring for axial bracing between cover and clutch housing.

* * * * *